United States Patent
Wald et al.

(10) Patent No.: US 9,234,531 B2
(45) Date of Patent: Jan. 12, 2016

(54) DAMPING ELEMENT FOR A MOTOR VEHICLE HYDRAULIC SYSTEM

(71) Applicants: Lucas Automotive GmbH, Koblenz (DE); Kelsey-Hayes Company, Livonia, MI (US)

(72) Inventors: Thomas Wald, Hollnich (DE); David Lopez-Larequi, Koblenz (DE); Georg Kedak, Thuer (DE); Joseph F. Zeoli, Livonia, MI (US); Joseph A. Starr, Plymouth, MI (US); William P. Caldwell, South Lyon, MI (US); Richard A. Swarich, Plymouth, MI (US)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 92 days.

(21) Appl. No.: 13/843,736

(22) Filed: Mar. 15, 2013

(65) Prior Publication Data
US 2014/0000740 A1 Jan. 2, 2014

Related U.S. Application Data

(60) Provisional application No. 61/748,459, filed on Jan. 3, 2013.

(30) Foreign Application Priority Data

Jun. 29, 2012 (DE) .......... 10 2012 012 971

(51) Int. Cl.
*B60T 8/1755* (2006.01)
*F15B 1/04* (2006.01)
(Continued)

(52) U.S. Cl.
CPC . *F15B 1/04* (2013.01); *B60T 17/04* (2013.01); *F16L 55/053* (2013.01)

(58) Field of Classification Search
USPC .............. 303/87, 11; 138/30, 31; 267/35
See application file for complete search history.

(56) References Cited

U.S. PATENT DOCUMENTS 3,931,834 A * 1/1976 Caillet ........................... 138/30
4,352,487 A * 10/1982 Shtarkman ..................... 267/35
5,718,488 A * 2/1998 Schneider et al. ............. 303/87
(Continued)

FOREIGN PATENT DOCUMENTS

DE  19524920 A1  1/1997
DE  19524921 A1  1/1997
(Continued)

*Primary Examiner* — Christopher Schwartz
(74) *Attorney, Agent, or Firm* — MacMillan, Sobanski & Todd, LLC

(57) ABSTRACT

A damping element for attenuating hydraulic pressure pulses is integrated into a hydraulic chamber of a motor vehicle hydraulic system. The damping element includes a end cap support body and a membrane that fits over a portion of the support body. The membrane has a first side facing towards a source of hydraulic fluid and a second side facing away from the hydraulic fluid source. At least one space is provided between the second side of the membrane and the end cap support body to allow for deformation of the membrane under hydraulic pressure. The membrane has a collar with a lip seal provided for fitting into place on the wall of the hydraulic chamber. At least one second space for receiving hydraulic fluid is defined between the lip seal and a region of the membrane opposite the lip seal.

18 Claims, 8 Drawing Sheets

(51) Int. Cl.
*F16L 55/053* (2006.01)
*B60T 17/04* (2006.01)

(56) References Cited

U.S. PATENT DOCUMENTS

| | | | |
|---|---|---|---|
| 6,017,099 A * | 1/2000 | Schneider et al. | 303/87 |
| 6,669,309 B1 | 12/2003 | Gierer et al. | |
| 6,848,755 B2 * | 2/2005 | Yuda et al. | 303/87 |
| 6,892,765 B2 | 5/2005 | Kamimura | |
| 7,318,452 B2 | 1/2008 | Yoshihara et al. | |
| 2006/0103233 A1 * | 5/2006 | Lenz | 303/87 |
| 2012/0133201 A1 * | 5/2012 | Zeoli et al. | 303/11 |

FOREIGN PATENT DOCUMENTS

| | | |
|---|---|---|
| DE | 19753909 A1 | 5/1999 |
| DE | 19753309 A1 | 6/1999 |
| DE | 19856697 A1 | 6/2000 |
| DE | 19910100 A1 | 9/2000 |
| DE | 60118389 T2 | 8/2006 |
| DE | 60118573 T2 | 8/2006 |
| DE | 19948444 B4 | 5/2007 |
| EP | 0456597 A1 | 5/1991 |
| EP | 0921049 A2 | 6/1999 |
| JP | H07293588 A | 11/1995 |
| WO | 9511824 A1 | 5/1995 |
| WO | 9800320 A1 | 1/1998 |
| WO | 0068051 A1 | 11/2000 |

* cited by examiner

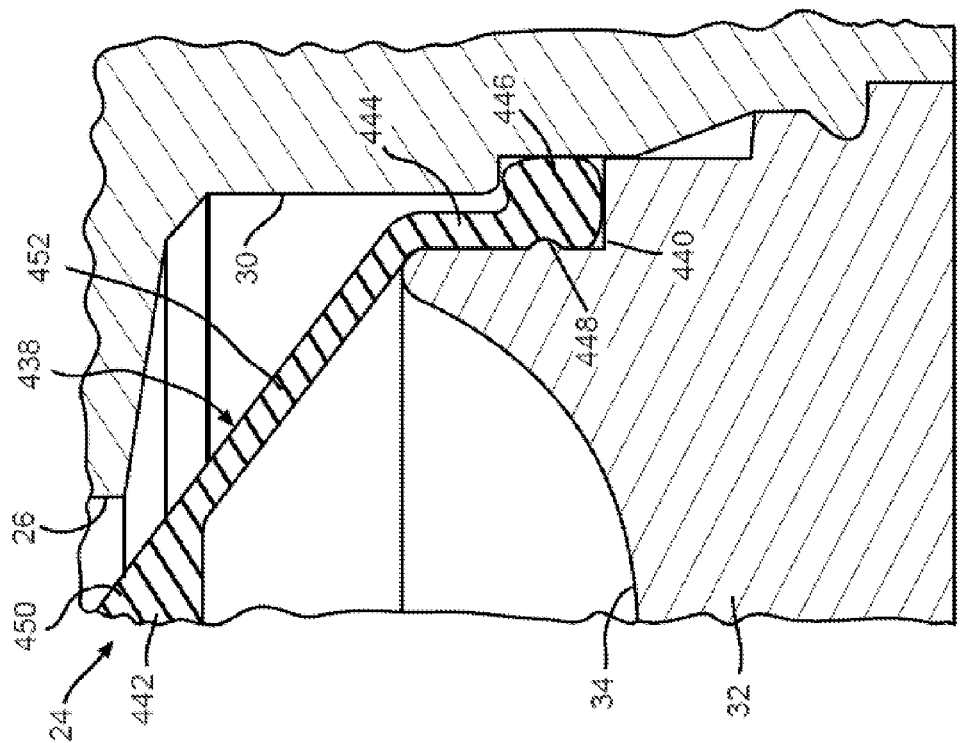
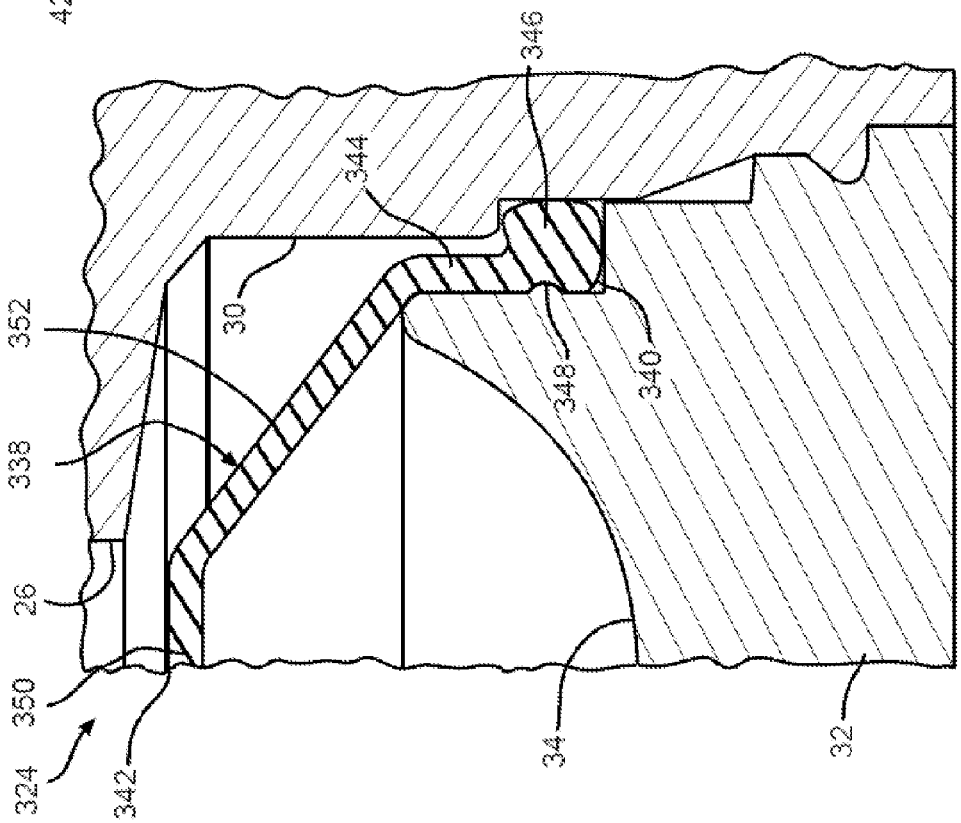

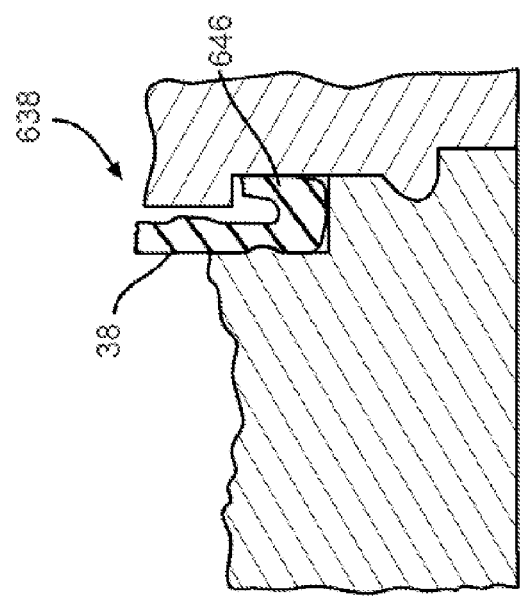
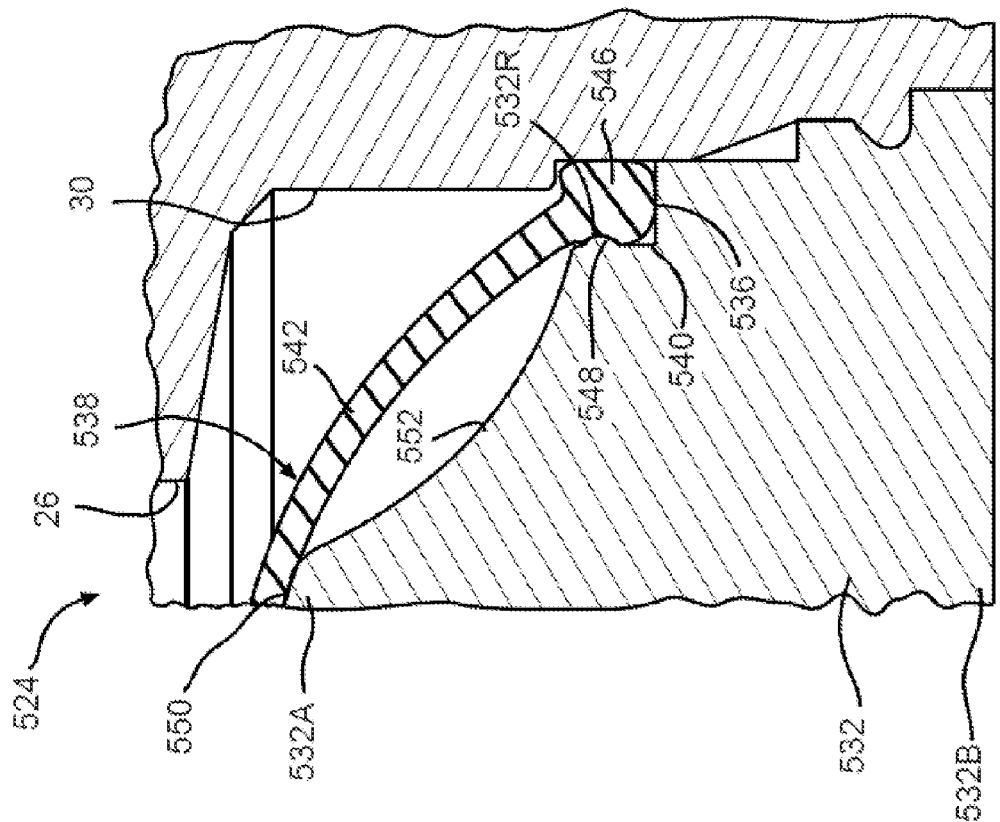

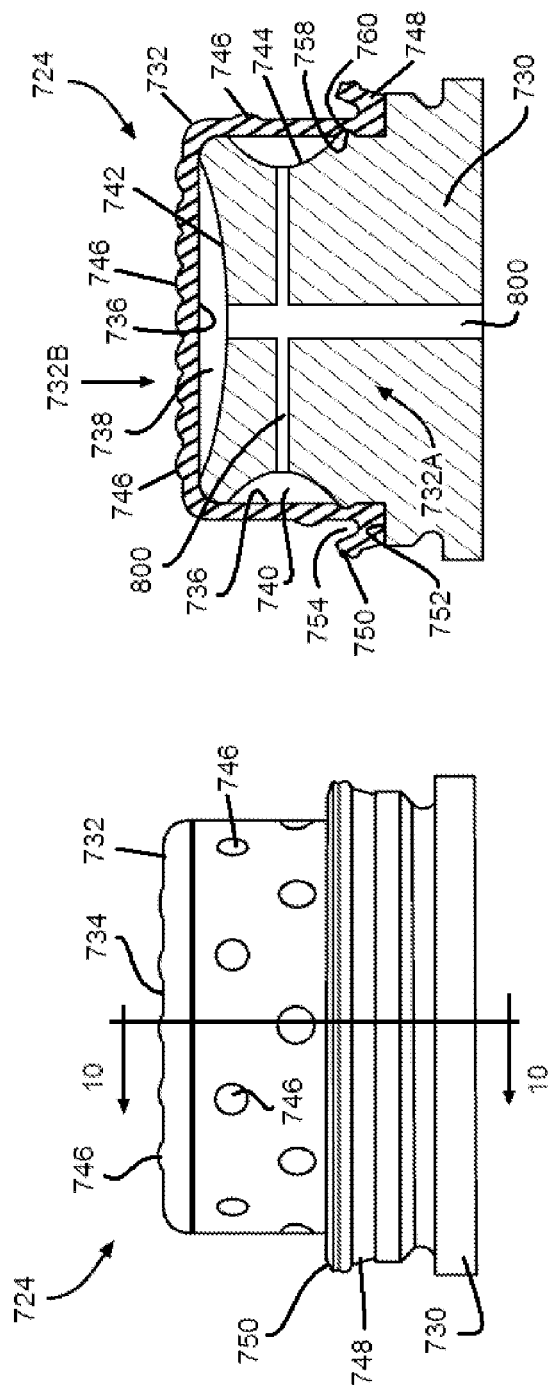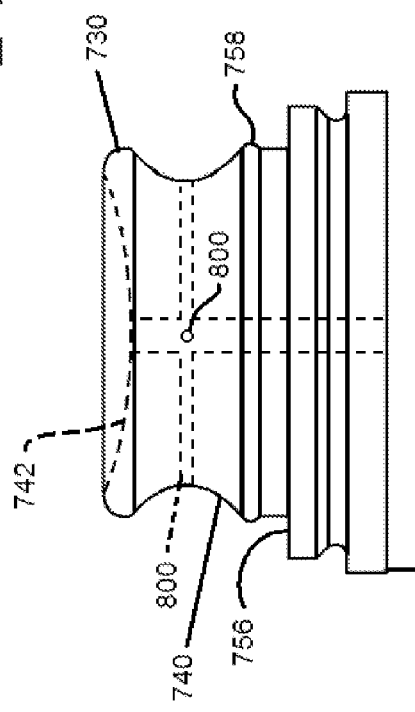

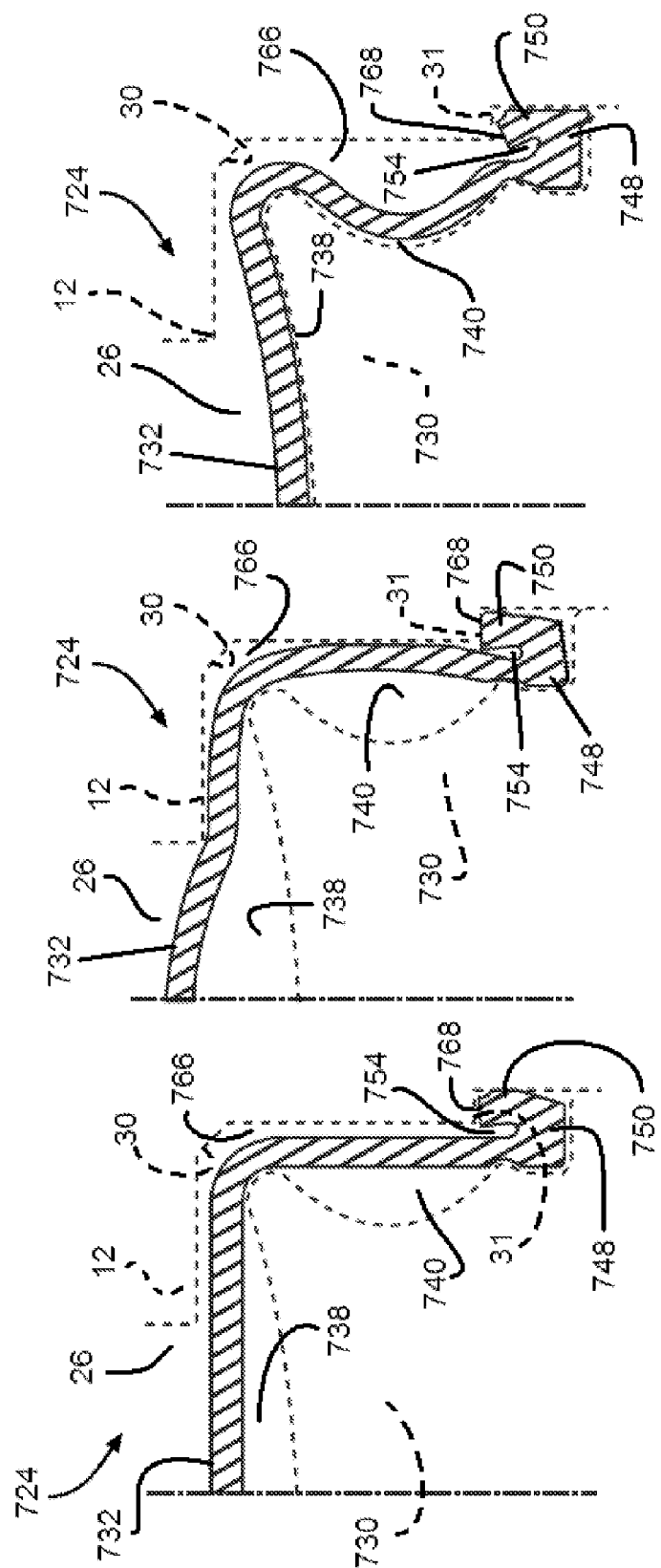

DAMPING ELEMENT FOR A MOTOR VEHICLE HYDRAULIC SYSTEM

CROSS-REFERENCE TO RELATED APPLICATIONS

This application claims the benefit of German Patent Application No. 10 2012 012 971.8, filed Jun. 29, 2012, and U.S. Provisional Application No. 61/748,459, filed Jan. 3, 2013. The disclosures of both applications are incorporated herein by reference.

BACKGROUND OF THE INVENTION

This invention relates in general to motor vehicle hydraulic systems. In particular, this invention relates to a damping element for integration into a hydraulic system, such as a motor vehicle hydraulic system.

Hydraulic systems are provided in various applications within a motor vehicle. Hydraulic brake and steering systems are two examples of such systems. These systems rely on hydraulic pressure, created by various sources, to effect their intended operation. Devices for autonomously generating brake pressure are part of driver assistance functions, such as, for example, a vehicle stability control (VSC). Autonomously generating brake pressure makes it possible to brake individual wheels or all wheels of the vehicle independently of the driver actuating the brake. Additional driver assistance functions may also include, for example, adaptive cruise control (ACC).

When the ACC function is activated, the distance and relative speed of a vehicle traveling up ahead is recorded, for example by laser distance sensors or radar distance sensors. The ACC function maintains a speed selected by the driver until a slower vehicle traveling up ahead is identified and a safe distance from it is no longer being maintained. In this case, the ACC function engages by braking to a limited extent and, if needed, by subsequent acceleration in order to maintain a defined spatial or temporal distance from the vehicle traveling up ahead. Additional ACC functions are expanded to the extent of also braking the vehicle to a stop. This is used for example in the case of a follow-to-stop function or a function to minimize the occurrence of a collision.

Further developments also permit a stop-and-go function, wherein the vehicle also starts automatically if the vehicle up ahead is set in motion again. The stop-and-go function typically executes a frequently changing autonomous pressure build-up to approximately 30 to 40 bar in the vehicle braking system independent of the generation of brake pressure originating from the driver. In the case of typical speeds on freeways, an autonomous deceleration is often restricted to approximately 0.2 g. At lower speeds, however, the system can generate an autonomous deceleration of 0.6 g, for example. A further development also includes an automatic emergency brake (AEB), whereby the AEB function detects potential accident situations in due time, warns the driver, and initiates measures to autonomously brake the vehicle with full force. In this case, rapid brake pressure build-up rates may occur.

An issue related to the operation of hydraulic systems, generally, is that hydraulic fluid pulsations may occur due to the operation of a hydraulic pump or for other reasons. These types of pulsations can lead to undesirable operating noises and can furthermore reduce the operating capacity of a hydraulic pump.

Thus, it would be desirable to provide an improved damping element or attenuator to dampen the low energy vibrations and pressure pulses. In particular, it would be beneficial to dampen these vibrations that occur on the inlet side of the pump during braking events, such as autonomous braking events.

SUMMARY OF THE INVENTION

This invention relates to a damping element for integration into a hydraulic system, such as a motor vehicle hydraulic system. In one embodiment, the damping element may be configured as an attenuator that is mounted in a hydraulic control unit of an electronically controlled brake system. In one embodiment, the damping element or attenuator includes a support body or end cap, and a membrane. The membrane generally conforms or is arranged in a close fit relationship, at least in some regions, to the profile of the support body. The membrane has a first side facing towards a source of hydraulic fluid and a second side facing away from the hydraulic fluid source. There is at least one first space, provided between the second side of the membrane and the support body, to allow for deformation of the membrane under hydraulic pressure. In one embodiment, the first space may be formed into the support body. In an alternative embodiment, the first space may be divided between the support body and a domed portion of the membrane. The domed portion of the membrane may be configured with central portion that extends beyond the side walls of the support body that define the first space formed into the support body. The central portion of the membrane may transition into the portion of the membrane engaging the support body by way of blended radii, angled straight sections, or a single continuous radius, if desired.

The membrane has a sealing structure positioned proximate to an open end. In one embodiment, the sealing structure is configured as a collar with a lip. The lip defines an outer edge of the sealing structure and includes a void or open space between the lip and a region of the membrane opposite the lip. The void is adapted to receive hydraulic fluid under pressure and cause the lip to deflect against a wall of the hydraulic chamber to augment sealing pressure. The void may be continuous and concentric with the chamber wall. Alternatively, the void may be a plurality of segmented spaces between a membrane side wall and the lip. In a particular configuration of the sealing structure, the sealing lip may have a continuous, circumferential projection that is configured to contact the hydraulic chamber wall. The membrane may further include one or more projections, similar to rounded bumps that assist in preventing the membrane from sticking to the hydraulic chamber wall. In another embodiment, the membrane may include a first structure on the second side, facing away from the hydraulic fluid. The membrane first structure may be configured to cooperate with a second structure formed on the contacting wall of the support body. In one embodiment, the support body second structure is generally complementary in shape to the membrane first structure.

The support body can be shaped as desired. In one embodiment, the support body is cylindrically shaped and comprises a longitudinal axis and a step extending away from the longitudinal axis. In one configuration, the collar of the sealing lip has a bottom portion which fits closely on the step of the support body. The bottom portion of the collar may also be brought into contact with the step by the force of hydraulic pressure. The support body may have the at least one first space formed on the side facing the membrane second side and intersecting the longitudinal axis of the support body. The support body may have a second space that faces the membrane second side and is concentric with the longitudinal axis of the support body.

In one embodiment, a motor vehicle hydraulic unit includes a hydraulic control unit (HCU) that includes a housing having bores for mounting valves and the like and channels for directing fluid. The damping element or attenuator may be mounted in one of the bores in the HCU. The damping element may be mounted in a fluid tight arrangement and may be retained, in part, by caulking. The HCU may be a vehicular hydraulic braking unit or a vehicular hydraulic steering unit.

Various aspects of this invention will become apparent to those skilled in the art from the following detailed description of the preferred embodiments, when read in light of the accompanying drawings.

BRIEF DESCRIPTION OF THE DRAWINGS

FIG. 5 is an enlarged cross sectional view of a portion of a fourth embodiment of the attenuator.

FIG. 6 is an enlarged cross sectional view of a portion of a fifth embodiment of the attenuator.

FIG. 7 is an enlarged cross sectional view of a portion of a sixth embodiment of the attenuator.

FIG. 8 is an enlarged cross sectional view of a portion of an alternate embodiment of the membrane illustrated in FIG. 2.

FIG. 9 is a side view of a seventh embodiment of the attenuator.

FIG. 10 is a cross sectional view of the attenuator of FIG. 9 taken along line 10-10.

FIG. 11 is a side view of an end cap of the attenuator of FIG. 9.

FIG. 14 is a schematic illustration of an attenuator membrane in a neutral or unpressurized state, accordance with the various embodiments of the attenuator.

FIG. 15 is a schematic illustration of the attenuator membrane of FIG. 14 reacting to a vacuum or negative hydraulic pressure applied to the hydraulic circuit.

FIG. 16 is a schematic illustration of the attenuator membrane of FIG. 14 reacting to a positive hydraulic pressure applied to the hydraulic circuit.

DETAILED DESCRIPTION OF THE PREFERRED EMBODIMENTS

Figure 1:
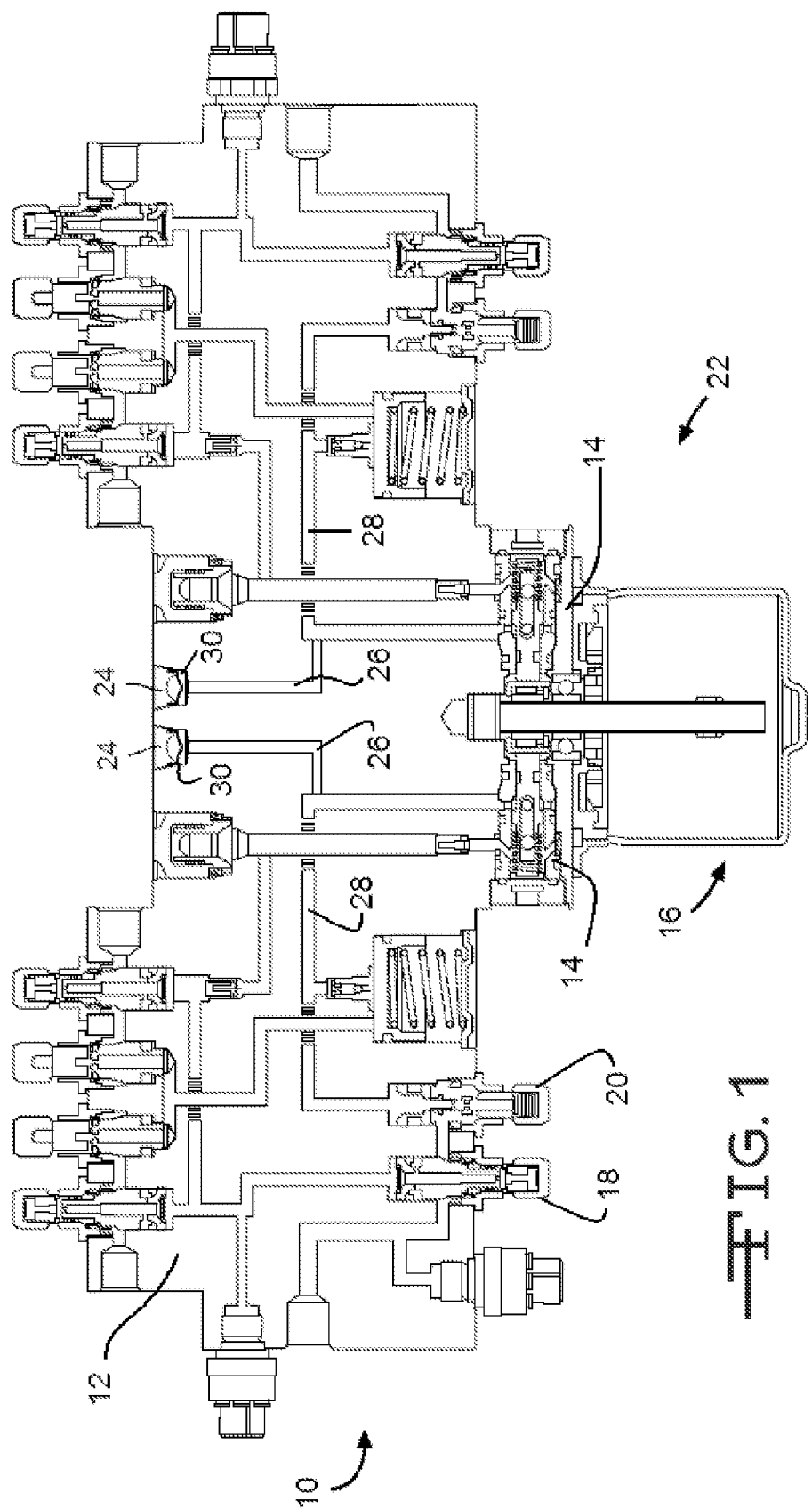
FIG. 1 is a hydraulic circuit diagram of a vehicle braking system with an attenuator according to the invention.

Referring now to the drawings, there is illustrated in FIG. 1 a hydraulic vehicle braking system shown generally at 10. The illustrated embodiment of the vehicle brake system 10 includes valves and other components described below. The vehicle brake system 10 is intended to be exemplary and it will be appreciated that there are other hydraulic system configurations, such as other vehicular brake control systems, steering systems, suspension systems, or body accessory systems, that may be used to implement the various attenuator embodiments described herein. In other embodiments, the brake system 10 may include components to provide electronic stability control (ESC), anti-lock braking, traction control, and/or vehicle stability control functions.

The vehicle brake system 10 includes a valve housing 12. The illustrated embodiment of the vehicle brake system 10 is shown having two piston pumps 14, which may be driven by a variable speed motor 16, described below, mounted in the valve housing 12, though other configurations are considered within the scope of the invention. The vehicle brake system 10 supplies pressurized fluid pressure to brake cylinders (not shown) of the brakes through a valve arrangement, such as the valves 18 and 20.

Brake fluid pressure may be built up independently of a driver-controlled first pressure generating unit, such as a brake pedal and master cylinder assembly, (not shown) by an autonomous second pressure generating unit 22, which includes the pumps 14 and the motor 16 and a damping element, such as an attenuator 24. The attenuator 24 is illustrated as being installed in an attenuator bore 30 that is in fluid communication with a pump inlet line 28 and a source of pressurized hydraulic fluid via a fluid conduit 26. In other configurations, the attenuator 24 may provided on the pump outlet line. Pulsations emanating from the pumps 14 are periodic fluctuations in the brake fluid flow. The attenuator 24 takes in brake fluid during the pulsation peaks and releases it again between the pulsation peaks. As a result, the attenuator 24 levels out a temporal pressure progression on the inlet side of the pump 14. In FIG. 1, the attenuator 24 is located after valve 20, which is illustrated as a supply control valve, which controls the supply of fluid to the pump inlet line 28 during autonomous braking events. It will be understood that the attenuator 24 may also be located elsewhere, such as before the supply control valve 20.

Figure 2:
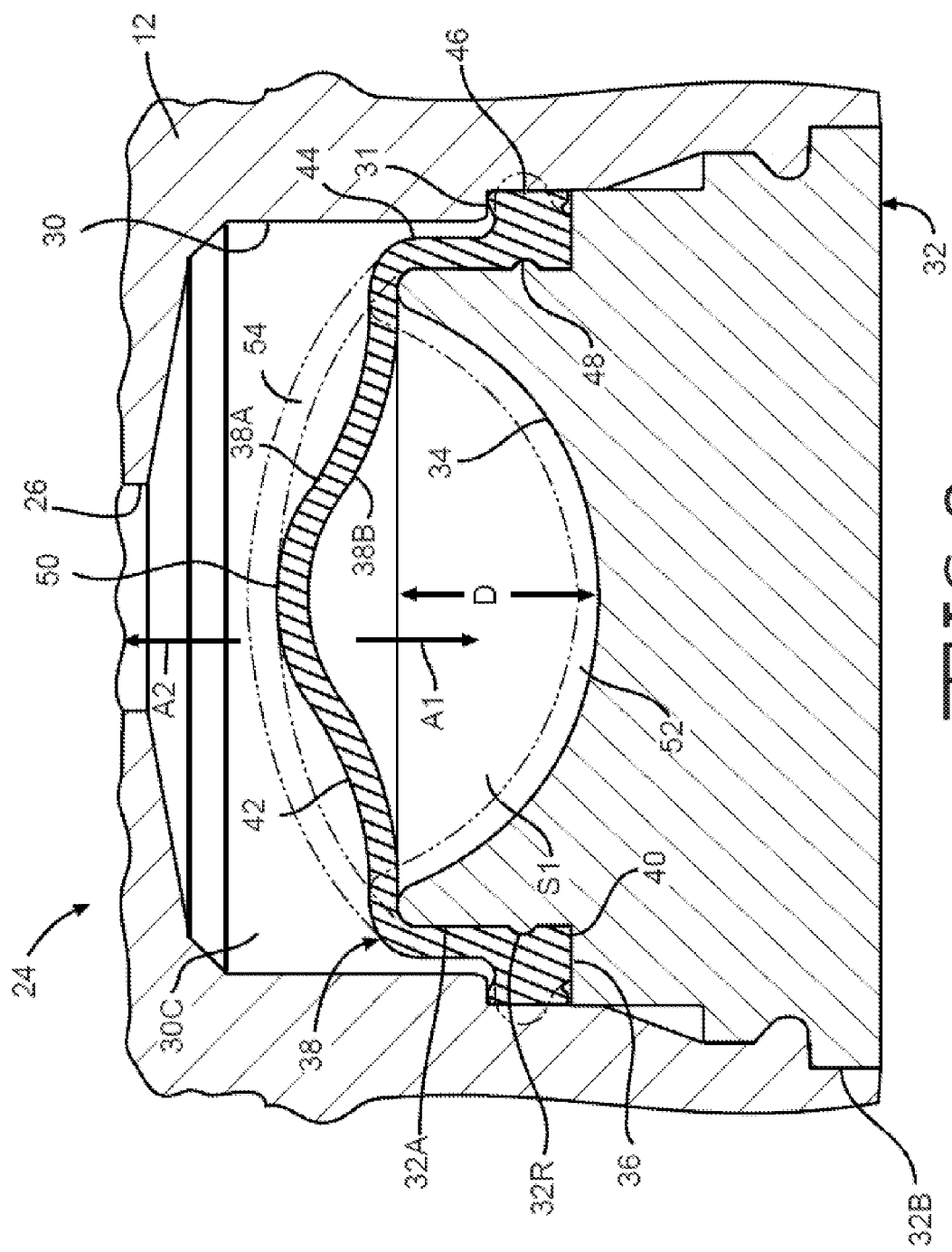
FIG. 2 is an enlarged cross sectional view of a first embodiment of the attenuator illustrated in FIG. 1.

A first embodiment of the attenuator 24 is illustrated in FIG. 2. In the illustrated embodiment, the attenuator 24 is disposed in the attenuator bore 30 of the valve housing 12. In the illustrated embodiment, the valve housing 12 is a hydraulic control unit (HCU). The bore 30 includes a stepped portion 31 which defines a seat for a sealing portion of a membrane 38, described below.

The fluid conduit 26 is formed in the HCU 12 and allows pressurized fluid flow between the pump 20 and the bore 30 via a pump fluid inlet conduit 28, shown in FIG. 1.

The attenuator 24 includes a support body, also known as an end cap 32, that is mounted in the bore 30 in a fluid-tight manner, such as by caulking, clinching, staking, press fitting, bonding, welding, or any other suitable method or combination of methods. The attenuator 24 may be permanently or removably mounted in the bore 30. The end cap 32 includes a first end 32A which faces the fluid conduit 26. A cavity 34, having a concave profile, is formed in the first end 32A of the end cap 32. The concave profile is illustrated having a depth D that extends below a stepped portion 36 of the end cap 32, that establishes a volume of the cavity 34. The cavity 34 may have a volume that is larger or smaller than illustrated in order to tune the attenuator for various system configurations. It should be understood that the cavity may have profiles other than concave, if so desired. In the illustrated embodiment, the first end 32A of the end cap 32 has a diameter smaller than a diameter of a second end 32B of the end cap 32. The stepped portion 36 is formed between the first end 32A and the second end 32B of the end cap 32 and defines a seat for a sealing portion of a membrane 38. A circumferentially extending ridge 32R is formed on the outer surface of the first end 32A of the end cap 32. The illustrated end cap 32 is formed from steel; however, the end cap 32 may be formed other materials.

The first end 32A of the end cap 32 is covered by the membrane 38, which is formed from a resilient material. The membrane 38 is generally cup-shaped and includes an open end 40, a closed end 42, and a substantially cylindrical side wall 44. A circumferentially, outwardly extending sealing flange 46 is formed at the open end 40. A circumferentially extending groove 48 is formed on the inner surface of the side wall 44 opposite the flange 46 and is structured and configured to engage the ridge 32R formed on the outer surface of the first end 32A of the end cap 32. The sealing flange 46 is seated between the stepped portion 31 and the stepped portion 36. The closed end 42 includes a domed portion 50, illustrated as outwardly extending and centrally positioned at the closed end 42 of the membrane 38. A fluid cavity 30C is defined between a first side 38A of the membrane 38 and the bore 30. A first space S1 is defined between a second side 38B of the membrane 38 and the cavity 34. In the illustrated embodiment, the membrane 38 is formed from an elastomeric material, such as EPDM rubber. Alternatively, the membrane 38 may be formed from any other resiliently deformable material, such as urethane, nitrile, or other polymers.

In operation, as pressurized hydraulic fluid flows into the fluid cavity 30C of the bore 30 via the conduit 26, the closed end 42 of the membrane 38 is urged toward the cavity 34 in the direction of the arrow A1 to a positively pressurized membrane position, such as is shown at 52. As pressurized fluid flows out of the bore 30 via the conduit 26, the closed end 42 of the membrane 38 is urged outwardly and away from the cavity 34 in the direction of the arrow A2 to a negatively pressurized (vacuum) membrane position, such as shown at 54. It should be understood that the positive and negative pressurized positions 52 and 54 of the membrane 38 are not absolute and are shown for explanatory purposes. The deflection of the membrane 38 may deviate from these positions in response to positive and negative fluid pressure.

In the illustrated embodiment, the outwardly extending and centrally positioned domed portion 50 provides additional material in the closed end 42 of the membrane 38. When the membrane 38 is urged toward the cavity 34 in the direction of the arrow A1 to a position such as shown at 52, the additional material in the domed portion 50 allows the closed end 42 to engage the surface of the cavity 34 with minimal or no stretching of the material in the closed end 42. This prevents excessive fatigue loading of the membrane 38 to increase life and provide a desired deflection response of the membrane to applied fluid pressure.

Figure 3:
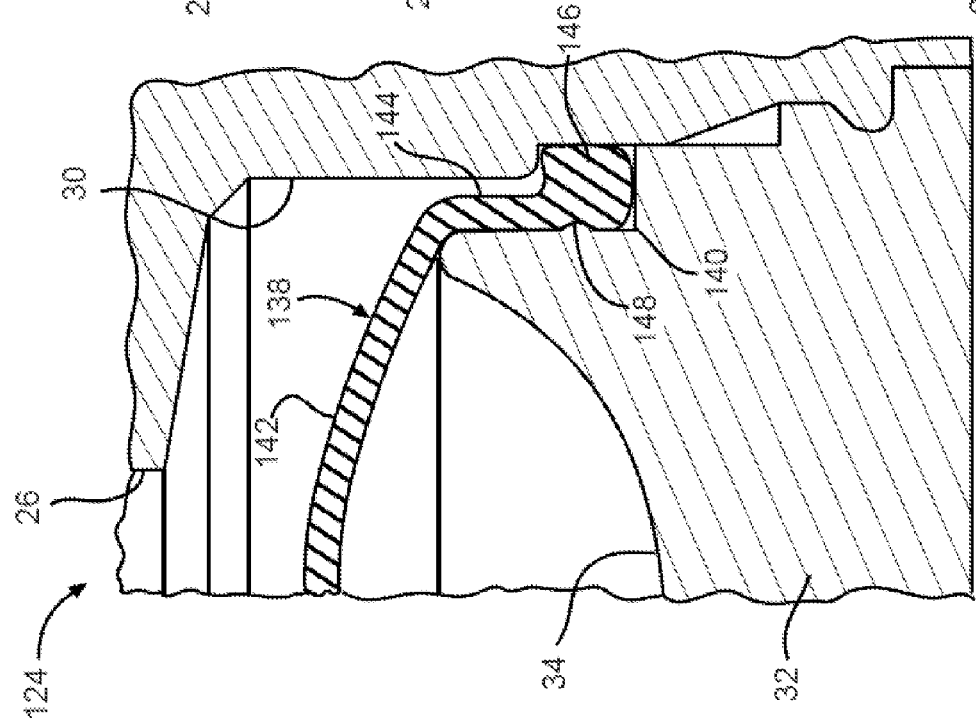
FIG. 3 is an enlarged cross sectional view of a portion of a second embodiment of the attenuator.

Referring now to FIG. 3, a portion of a second embodiment of the attenuator is shown at 124. The attenuator 124 is similar to the attenuator 24 and includes the end cap 32 and a membrane 138. The membrane 138 is similar to the membrane 38, is generally cup-shaped, and includes an open end 140, a closed end 142, and a substantially cylindrical side wall 144. A circumferentially outwardly extending sealing flange 146 is formed at the open end 140. A circumferentially outwardly extending groove 148 is formed on the inner surface of the side wall 144 opposite the flange 146. The closed end 142 has a substantially domed shape extending across the first end 32A of the end cap 32 and extending toward the conduit 26. As shown, the closed end 142 has a generally arcuate cross-sectional shape.

Figure 4:
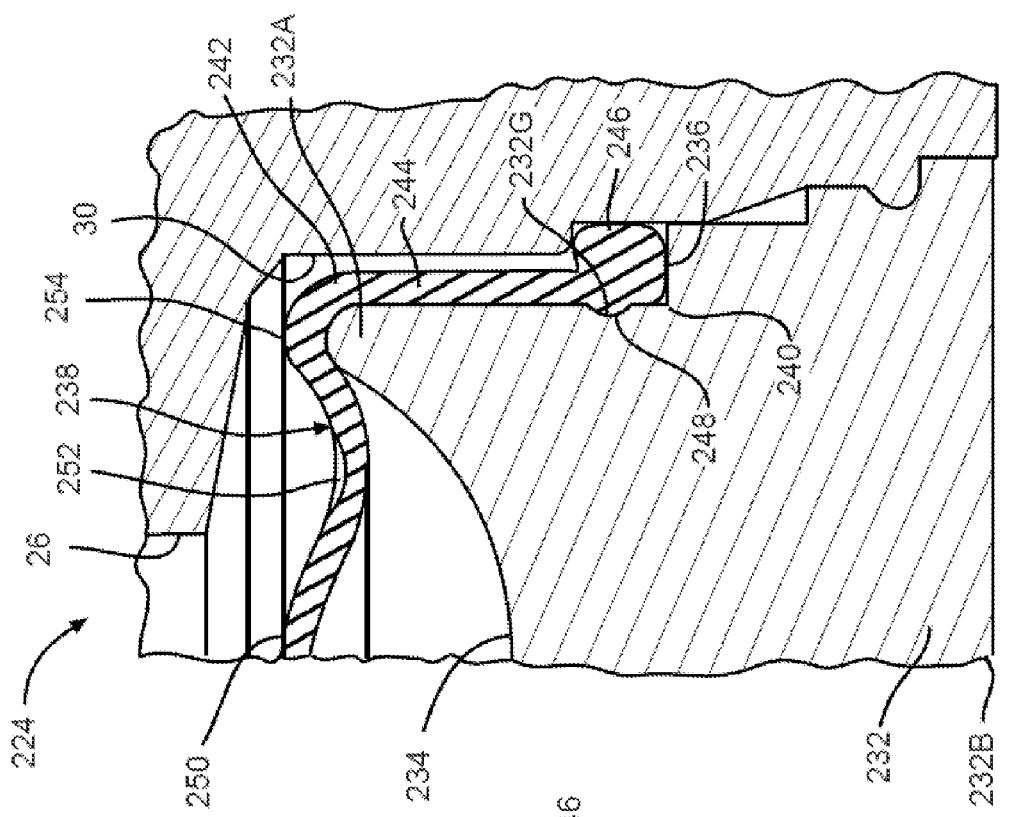
FIG. 4 is an enlarged cross sectional view of a portion of a third embodiment of the attenuator.

Referring now to FIG. 4, a portion of a third embodiment of an attenuator is shown at 224. The attenuator 224 is similar to the attenuator 24 and includes an end cap 232 and a membrane 238. The end cap 232 includes a first end 232A which faces the fluid conduit 26. A concave cavity 234 is formed in the first end 232A of the end cap 232. The concave cavity 234 is configured as having a shallower depth than the depth D of the concave cavity 34, though such is not required. In the illustrated embodiment, the first end 232A of the end cap 232 has a diameter smaller than a diameter of a second end 232B of the end cap 232. A stepped portion 236 is formed between the first end 232A and the second end 232B of the end cap 232 and defines a seat for a sealing portion of the membrane 238. A circumferentially inwardly extending groove 232G is formed on the outer surface of the first end 232A of the end cap 232.

The membrane 238 is similar to the membrane 38, is substantially cup-shaped and includes an open end 240, a closed end 242, and a substantially cylindrical side wall 244. A circumferentially outwardly extending sealing flange 246 is formed at the open end 240. A circumferential extending ridge 248 is formed on the inner surface of the side wall 244 opposite the flange 246. The closed end 242 includes a circular groove 252 defined between an outwardly extending and centrally positioned domed portion 250 and a circular shoulder portion 254. The groove 252 provides a localized deflection point as the membrane 238 responds to fluid pressure. The localized deflection point permits tuning of the dynamic response of the membrane 238 in conjunction with the frequency of the fluid pressure pulses generated by the second pressure generating unit 22.

Referring now to FIG. 5, a portion of a fourth embodiment of an attenuator is shown at 324. The attenuator 324 is similar to the attenuator 24 and includes the end cap 32 and a membrane 338. The membrane 338 is substantially cup-shaped and includes an open end 340, a closed end 342, and a substantially cylindrical side wall 344. A circumferentially outwardly extending sealing flange 346 is formed at the open end 340. A circumferentially extending groove 348 is formed on the inner surface of the side wall 344 opposite the flange 346. The closed end 342 has a substantially frusto-conical shape and includes a substantially flat end wall 350 and a side wall 352.

Referring now to FIG. 6, a portion of a fifth embodiment of an attenuator is shown at 424. The attenuator 424 is similar to the attenuator 324 and includes the end cap 32 and a membrane 438. The membrane 438 is substantially cup-shaped and includes an open end 440, a closed end 442, and a substantially cylindrical side wall 444. A circumferentially outwardly extending sealing flange 446 is formed at the open end 440. A circumferentially extending groove 448 is formed on the inner surface of the side wall 444 opposite the flange 446. The closed end 442 has a substantially conical shape and includes a side wall 452. A thickened portion having a substantially triangular cross-sectional shape defines an end wall 450.

Referring now to FIG. 7, a portion of a sixth embodiment of an attenuator is shown at 524. The attenuator 524 is similar to the attenuator 24 and includes an end cap 532 and a membrane 538. The end cap 532 includes a first end 532A which faces the fluid conduit 26. In the illustrated embodiment, a portion of the first end 532A of the end cap 532 has a diameter smaller than a diameter of a second end 532B of the end cap 232. A stepped portion 536 is formed between the first end 532A and the second end 532B of the end cap 532 and defines a seat for a sealing portion of the membrane 538. A circumferentially extending ridge 532R is formed on the outer surface of the first end 532A of the end cap 532. The first end 532A includes a concave side wall 552 extending from the ridge 532R toward the conduit 26 and terminating in a centrally positioned domed portion 550. The concave side wall 552 is angled relative to the bore 30, and is illustrated as being angled at approximately 45 degrees to the side wall of the bore 30. It should be understood that the concave side wall 552 may be oriented at other angles relative to the side wall of the bore 30, if desired.

The membrane 538 is similar to the membrane 138, is substantially cup-shaped and includes an open end 540 and a closed end 542. A circumferentially outwardly extending sealing flange 546 is formed at the open end 540. A circumferentially extending groove 548 is formed on the inner surface of the membrane 538 opposite the flange 546. The closed end 542 has a substantially domed shape extending from the flange 546 toward the conduit 26 and having an arcuate cross-sectional shape. In the illustrated embodiment, an inner surface of the closed end 542 of the membrane 538 engages an outer surface of the domed portion 550 of the end cap 532. During operation, the closed end 542 of the membrane 538 may lift off of the domed portion 550 of the end cap 532 in response to the hydraulic fluid pressure.

Referring now to FIG. 8, a portion of an alternate embodiment of a membrane is shown at 638. The membrane 638 includes a lip seal 646 in lieu of a sealing flange, such as the sealing flange 46. It will be understood that a lip seal may be provided in lieu of any of the sealing flanges described above in FIGS. 2 through 7. The operation of the lip seal 638 will be discussed in detail below in conjunction with other seal embodiments.

Referring now to FIGS. 9 and 10, there is illustrated another embodiment of an attenuator, shown generally at 724. The attenuator 724 includes an end cap 730, also shown in FIG. 11, though other embodiments of end caps may be used if desired, and a membrane 732. The end cap 730 is illustrated as a solid, circular cylindrical body fabricated from a metallic material, though other suitable materials may be used if desired. The membrane 732 has an open end 732A and a closed end 732B. As with the membrane embodiments described above, closed end 732B of the membrane 732 includes a first side (outside) 734 facing the hydraulic fluid and an opposite second side (inside) 736 facing away from the hydraulic fluid. The second side 736 of the membrane 732 faces the end cap 730. As shown in FIGS. 10 and 11, the end cap 730 includes two spaces 738 and 740 into which the membrane 732 can deform when subjected to hydraulic pressure. The spaces 738 and 740 are provided between the second side 736 of the membrane 732 and the support body 730. The spaces 738 and 740 may be filled with a fluid, such as air, or another material that permits the membrane 730 to move in response to the force of hydraulic fluid pressure. As shown, the first space 738 is a concave cavity, similar to the cavities described above in the other embodiments. The first space 738 may have any profile suitable to permit the membrane 732 to move in response to the applied fluid pressure pulsations. The first space 738 is positioned on a front face 742 of the end cap 730 and faces the membrane 732. The second space 740 is an annular groove, having a concave cross section, that extends continuously around a side face 744 of the end cap 730. Similar to the first space, the second space 740 may have any profile that permits the membrane 732 to respond to the fluid pressure pulses.

The membrane 732 has a plurality of projections 746, illustrated as generally arcuately profiled bumps or naps distributed over the surface of the first side (outside) 734. The projections 746 may be any shape and height suitable to keep the membrane 732 from sticking to the hydraulic chamber wall of the attenuator bore 30, shown in FIG. 1. The projections 746 may provide gaps, filled with hydraulic fluid against the bore walls, and a resilient biasing force that urges localized portions of the membrane 732 near the projections 746 away from the bore walls. This assists in ensuring that hydraulic fluid can flow in the regions between the hydraulic chamber wall and the membrane 732.

The membrane 732 has a collar 748 proximate to the open end 732A. The collar 748 has a lip seal 750 and a bottom portion 752. When the attenuator 724 is installed into the bore 30 of the HCU 10, as shown in FIG. 1, the lip seal 750 is pressed against the wall of the hydraulic chamber, similar to the embodiment of FIG. 8, and thus seals the bore 30 of the HCU 10.

Figure 13:
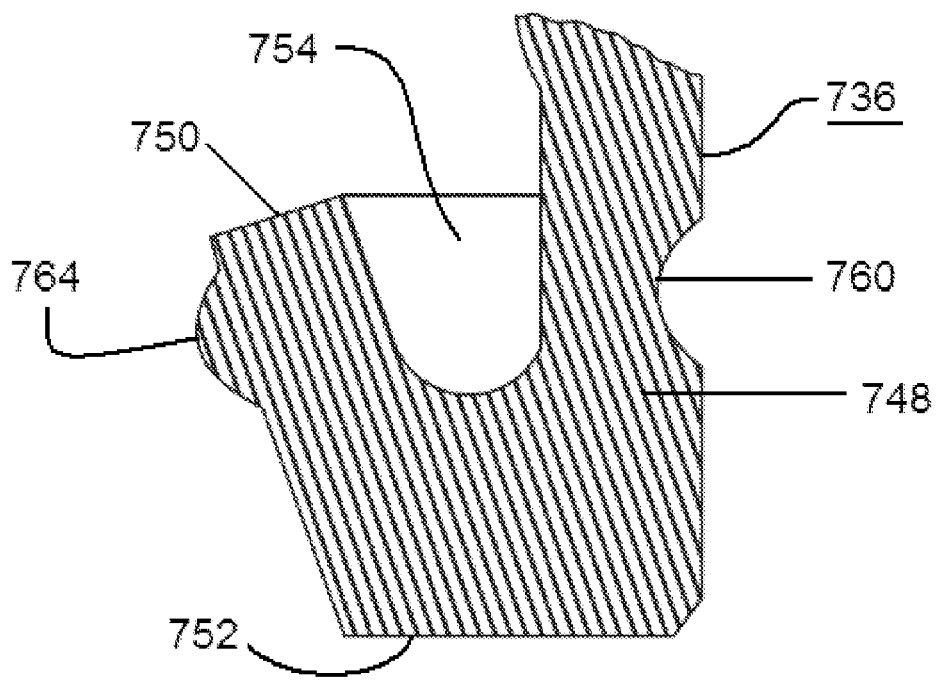
FIG. 13 is an enlarged cross sectional view of a sealing flange portion of the attenuator membrane of FIG. 12.

As shown in FIGS. 10 and 13, a space or seal pocket 754 is defined between the lip seal 750 and the side wall of the membrane 732, opposite the lip seal 750. The seal pocket 754 is configured to receive hydraulic fluid and cause the lip seal 750 to respond to the pressure exerted by the fluid. When fluid pressure is positive, the lip seal 750 is pressed against the hydraulic chamber wall to augment the sealing effect of the membrane 732. The bottom portion 752 of the collar 748 fits closely against a step 756 of the end cap 730. The step 756 is illustrated as an extension of the diameter of the cylindrical end cap 730. When fluid pressure is applied to the bore 30 and the attenuator 724, the hydraulic fluid in the seal pocket 754 presses the bottom portion 752 of the collar 748 against the step 756. This process stabilizes the displacement and deformation of the lip seal 750 radially outwards and thus further improves the sealing effect of the membrane 732.

The end cap 730 includes an annular projection or ridge 758, similar to ridge 32R described above. The ridge 758 cooperates with a complementarily shaped, continuous recess 760 on the second side 736 of the membrane 732 to provide a positive-locking contact of the collar 748 with the end cap 730. The positive locking connection of the cooperating ridge 758 and recess 760 counteracts the tendency of the membrane 732 to pull up and away from the end cap 730. Alternatively, the membrane 732 and the end cap 730 may omit the cooperating ridge 758 and recess 760 and rely on frictional engagement of the collar against the end cap 730 and the bore 30 of the HCU 10. The frictional fit of the collar 748 may be increased by providing the inside diameter of the membrane 732 as a slightly smaller dimension than the maximum outside diameter of the contacting surface of the support body 730 to the collar 748. The end cap 730 also includes a flange 762 that provides the fixed attachment of the attenuator 724 within the bore 30 of the HCU 10. The flange 762 extends around the end cap 730 and accommodates the caulking step of the assembly and sealing process associated with installation of the attenuator 724 in the HCU 10.

As shown in FIGS. 10 and 11, the end cap 730 may include one or more passages 800 that communicate between the spaces 738 and 740 and atmosphere. Alternatively, the passages 800 may connect only one of the spaces 738 and 740 to atmosphere. The passages 800 may be connected to corresponding passages (not shown) in the HCU 10, if so desired. The passages 800 may be provided in any orientation, size, shape, and in any number desired. The passages 800 permit the gas pressure within the spaces 738 and 740 to vent to atmosphere and thus reduce the resistance of the membrane 732 during responses to the hydraulic fluid pressure pulses. This condition provides an additional tuning effect to match the membrane response to the pulsations generated in the hydraulic circuit.

Figure 12:
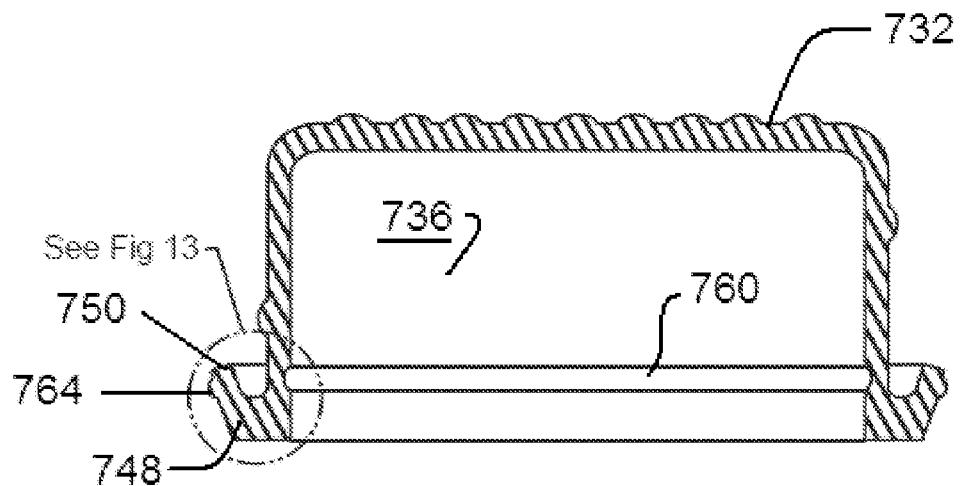
FIG. 12 is a cross sectional view of an attenuator membrane of the attenuator of FIG. 9.

Referring now to FIGS. 12 and 13, there is a sectional view of the membrane 732. As shown in this embodiment, the membrane 732 is generally pot-shaped or cap-shaped. The second side 736 of the membrane 732 is generally smooth and may also be provided with a coating or other layering to prevent permeability of hydraulic fluid through the material thickness of the membrane 732 into the spaces 738 and 740. The recess 760 is illustrated as having a concave profile and extending completely around the second side 736 proximate to the collar 748. Alternatively, the recess 760 may be segmented or discontinuous around the circumference of the second side 736. FIG. 13 illustrates an enlarged view of the collar 748 of the membrane 732. The collar 748 includes a seal ridge 764 that extends radially outward from the lip seal 750 toward the bore 30 of the HCU 10. The seal ridge 764 is a continuous annular projection, shown as a rounded bump having a bulged or convex cross section, though any shape and size of projection may be used. The seal ridge 764 increases the sealing effect of the lip seal 750 when pressurized hydraulic fluid acts on the seal pocket 754. As previously described, the fluid pressure presses the lip seal 750 and the seal ridge 764 against the wall of the bore 30 of the HCU 10.

Referring now to FIGS. 14, 15, and 16, there are illustrated different deflected states of the attenuator 724 reacting in response to various fluid pressure states during operation of the HCU 10. As described above, the attenuator 724 is sealed and fixed or otherwise caulked in a fluid-tight condition within a chamber 66 of the bore 30 of the HCU 10. The fluid conduit 26 connects a chamber 766 to the input side of the hydraulic pump 14. As shown in FIG. 14, the chamber 766 is in an unpressurized state and the attenuator 732 is in a neutral or generally unloaded condition with respect to fluid pressure. The membrane 732 is generally in the same deflected state as shown in FIGS. 9 and 10 with the exception that the collar 748 and lip seal 750 are compressed within the space between the bore 30 and the end cap 730.

Referring now to FIG. 15, the membrane 732 is exposed to a negative fluid pressure, such as when the hydraulic pump 20 is operated in a suction mode, where hydraulic fluid moves from the chamber 766 through the fluid conduit 26 and away from the membrane 732. The membrane 732 is drawn from the end cap 70 by the negative pressure (vacuum). The collar 748 is trapped between the steps formed in the bore 30 and the end cap 730, described above. The membrane 732 deflects toward the walls of the bore 30, thereby enlarging the volume of the spaces 738 and 740 between the end cap 730 and the membrane 732. In part, as a result of the negative pressure created within the spaces 738 and 740, fluid pulsations are damped and the pulsation peaks are reduced, especially during the suction peaks. In the illustrated suction mode, an end face 768 of the lip seal 750 is pressed against the step 31 formed in the bore 30. The sealing effect of the membrane 732 relative to the atmosphere is increased in this manner during the suction mode.

Referring now to FIG. 16, deflection of the membrane 732 is illustrated in response to the attenuator 724 being exposed to a positive hydraulic fluid pressure. The fluid pressure peaks press the membrane 732 in close conformance to the outside profile of the end cap 730. The membrane 732 elastically deforms into the spaces 738 and 740, compressing the gas trapped between the membrane 732 and the end cap 730. The volumes of the spaces 738 and 740 are reduced in proportion to the magnitude of the pressure exerted on the membrane 732. The compressed gas in the spaces 738 and 740 provide an additional restoring force to the membrane 732 which augments the damping of the fluid pressure pulses in the chamber 766. The pressure of the hydraulic fluid in the seal pocket 754 presses the lip seal 750 against the wall of the bore 30. This compression of the lip seal 750 against the bore wall increases sealing pressure and assists in preventing leakage around the collar 748 of the membrane 732. In particular, the lip seal 750 can deform into the seal space between the wall of the bore 30, on one side, and the side wall of the end cap 730 adjacent to the step 756 of the support body 30 on the other side. The sealing effect is again increased in this manner. The sealing effect that can be achieved by means of the collar 748 and the lip seal 750 is retained over a very wide temperature range. For this reason, the attenuator 724 allows for a reliable seal of the bores of the HCU 10.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An attenuator for integration into a hydraulic chamber of a motor vehicle hydraulic system comprising:
    a support body having a longitudinal axis and a step extending away from the longitudinal axis; and
    a membrane fitting closely on the support body at least in some regions, wherein the membrane has a first side facing towards a hydraulic fluid and a second side facing away from the hydraulic fluid, wherein at least one first space is provided between the second side of the membrane and the support body to allow for deformation of the membrane under hydraulic pressure, wherein the membrane has a collar with a lip seal provided for sealing on a wall of a hydraulic chamber and wherein at least one second space for receiving hydraulic fluid is defined between the lip seal and a region of the membrane opposite the lip seal, the hydraulic fluid pressing a bottom portion of the collar against the step under hydraulic pressure.

2. The attenuator of claim 1 wherein the lip seal includes a continuous projection configured to face a wall of the hydraulic chamber.

3. The attenuator of claim 2 wherein the projection is a seal ridge having a convex cross section.

4. The attenuator of claim 3 wherein the second space extends continuously along the hydraulic chamber wall.

5. The attenuator of claim 4 wherein the membrane includes projections, configured as naps, on the first side.

6. The attenuator of claim 5 wherein the membrane has a first structure on the second side and the support body has a second structure on a side facing the membrane, wherein the first structure and the second structure cooperate to produce a positive fit.

7. The attenuator of claim 6 wherein the support body is generally cylindrically shaped and wherein the membrane has a generally pot-shaped form, the membrane being configured to be pulled over the support body.

8. The attenuator of claim 7 wherein the at least one first space is formed in the support body.

9. The attenuator of claim 8 wherein the first space is formed on one of a front face of the support body facing the membrane and a side face of the support body proximate the hydraulic cylinder wall.

10. The attenuator of claim 9 wherein the support body is a solid body.

11. The attenuator of claim 1 wherein the membrane is in fluid communication with a bore formed in a hydraulic control unit of a motor vehicle hydraulic unit, the attenuator is inserted into the bore and provides a fluid-tight seal.

12. The attenuator of claim 11 wherein the support body is fastened into the bore by caulking.

13. The attenuator of claim 12 wherein the hydraulic unit is a hydraulic motor vehicle braking system.

14. The attenuator of claim 12 wherein the hydraulic unit is a hydraulic motor vehicle steering system.

15. An attenuator located in an attenuator bore of a housing in a vehicle braking system, the attenuator comprising:
    an end cap mounted within the attenuator bore. the end cap having a cavity; and
    a membrane attached to the end cap and engaging the end cap in at least some regions, the membrane having a closed end and a side wall defining an open end, the closed end being located closer to a source of pressurized hydraulic fluid than the open end and having a first side facing toward the source of pressurized hydraulic fluid and a second side facing away from the source of pressurized hydraulic fluid, at least a portion of the closed end having a dome-shaped portion extending in the direction of the source of pressurized hydraulic fluid, the side wall having a sealing flange which engages a wall of the attenuator bore;

wherein a first space is defined by the closed end of the membrane and the cavity of the end cap to allow deformation of the membrane when under hydraulic pressure such that the closed end having the dome-shaped portion engages a surface of the cavity.

16. The attenuator of claim 15 wherein the membrane include a plurality of naps configured as convex bumps that are distributed on the first side of the membrane, the membrane open end including a collar having a lip seal and a seal pocket between the membrane side wall and the lip seal, the seal pocket configured to contain a pressurized hydraulic fluid and apply a sealing pressure that is proportional to the hydraulic fluid pressure.

17. The attenuator of claim 16 wherein the cavity has a concave profile having a depth that extends below a stepped portion of the end cap.

18. An attenuator for integration into a hydraulic chamber of a motor vehicle hydraulic system comprising:

a support body; and a membrane having a close fitting relationship to at least a portion of the support body, the membrane having a first side facing towards a hydraulic fluid and a second side facing away from the hydraulic fluid, the membrane having a closed end and a side wall defining an open end, the membrane having a collar with a seal lip configured to seal on a wall of the hydraulic chamber, wherein a first space is provided between the second side of the closed end of the membrane and the end cap and a second space provided between the second side of the side wall of the membrane and the end cap, the second space allowing deformation of the membrane under hydraulic pressure and being defined by an annular groove continuously extending around a side wall of the support body.

* * * * *